3,121,114
2-(α-HALOALKANOYLAMINO)-BENZOPHENONES
Oscar Keller, Clifton, Norbert Steiger, Nutley, and Leo
  Henryk Sternbach, Upper Montclair, N.J., assignors to
  Hoffmann-La Roche Inc., Nutley, N.J., a corporation of
  New Jersey
No Drawing. Filed Mar. 21, 1962, Ser. No. 181,440
Claims priority, application Switzerland Dec. 2, 1960
  7 Claims. (Cl. 260—562)

This invention relates to substituted benzodiazepine compounds which have been found to possess valuable therapeutic properties. The invention also deals with intermediates for said compounds and methods of making said compounds. The benzodiazepine compounds of this invention all contain a phenyl substituent in the 5-position. Furthermore, either on the 5-position phenyl substituent or on the fused benzene ring all the benzodiazepine compounds of the invention contain a nitrogen containing substituent. More specifically, the benzodiazepine compounds of this invention are those chosen from the group consisting of nitrogen containing-substituent substituted 5 - phenyl-2-amino-3H-1,4-benzodiazepine 4 - oxides, 5-phenyl-3H-1,4-benzodiazepin-2(1H)-ones, and 5-phenyl-3H-1,4-benzodiazepin-2(1H)-one 4-oxides.

Thus, certain compounds of the invention are selected from the group consisting of compounds of the formula

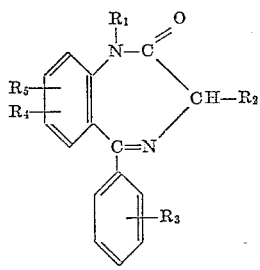

$R_1$, $R_2$ and $R_5$ are each selected from the group consisting of hydrogen and lower alkyl; and $R_3$ and $R_4$ are each selected from the group consisting of hydrogen, halogen, lower alkyl, nitro, amino, and lower acylamino; at least one of $R_3$ and $R_4$ being a nitrogen containing group.

As used in this disclosure, the term lower alkyl includes saturated branched chain or straight chain aliphatic hydrocarbon groups such as ethyl, methyl, propyl, isopropyl, n-butyl, iso-butyl, t-butyl, amyl and the like. The term halogen includes all four halogens, i.e. chlorine, bromine, iodine and fluorine. The lower acylamino groups represented by $R_3$ and $R_4$ are those in which the acyl radicals are derived from lower fatty (alkanoic) acids, forming groups such as acetylamino, propionylamino and the like.

The basic benzodiazepine compounds of this invention, i.e. the compounds of formula I above form acid addition salts. Since these compounds are valuable therapeutic agents, medicinally acceptable acid addition salts formed from pharmaceutically acceptable acids are preferred. These basic compounds of Formula I above form pharmaceutically acceptable acid addition salts with both organic and inorganic acids, such as hydrochloric acid, nitric acid, hydrobromic acid, p-toluene sulfonic acid, citric acid, maleic acid, succinic acid, mandelic acid, acetic acid, sulfuric acid, phosphoric acid, tartaric acid and the like.

The compounds of this invention are derived from substituted 2-aminobenzophenones. Several synthetic routes can be employed.

According to one method, the substituted 2-aminobenzophenone can be haloacylated, such as with bromoacetyl bromide, α-bromopropionyl bromide, chloroacetyl chloride, or the like, to yield a 2-(α-halo-lower alkanoylamino)-benzophenone of the formula

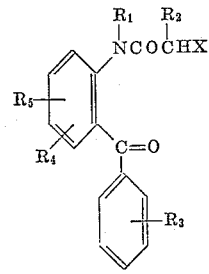

wherein X is halogen; $R_1$, $R_2$ and $R_5$ are each selected from the group consisting of hydrogen and lower alkyl; $R_3$ and $R_4$ are each selected from the group consisting of hydrogen, halogen, lower alkyl, nitro, amino and lower acylamino; at least one of $R_3$ and $R_4$ being a nitrogen containing group.

The resultant haloacylated-2-aminobenzophenone can then be treated with ammonia. This treatment with ammonia effects ring closure to obtain a benzodiazepinone conforming to Formula I above. It is most convenient from a viewpoint of operating economically and ease of handling to use alcoholic ammonia; however, other ammonia solutions can be used as is readily apparent to those skilled in the art.

Benzodiazepinones conforming to Formula I above can also be prepared by cyclizing a 2-(α-amino-lower alkanoylamino)-benzophenone. These 2 - (α-amino-lower-alkanoylamino)-benzophenones, their production, and their cyclization are not a part of this invention but are disclosed herewith in order that the present disclosure may be complete.

Compounds corresponding to Formula I above which contain a nitro group on either the fused benzene ring or on the 5-position phenyl ring can be converted to the corresponding amino compound by reducing the nitro group, for example, catalytically in the presence of Raney nickel. A lower alkanoyl group can be attached to the amino group by reacting with a lower alkanoic acid anhydride, such as acetic anhydride.

The compounds corresponding to Formula I above wherein $R_1$ is hydrogen can be alkylated in the 1-position, for example by forming the sodio derivative with a sodium alcoholate such as sodium methoxide in toluene and then reacting the sodio derivative with a dialkyl sulfate or an alkyl halide in an inert solvent, for example a hydrocarbon or dimethylformamide.

The compounds described above conforming to Formula I are useful as muscle relaxants and anti-convulsants. They can be used for the relief of tension and also in depressed states associated with tension. They can be administered by incorporating a therapeutic dosage of the compound, or a pharmacologically acceptable acid addition salt when formed, adjusted according to its nature and individual requirements, in a conventional liquid or solid vehicle to provide elixirs, suspensions, tablets, capsules, powders or the like according to conventional pharmaceutical practice.

Certain of the intermediates which are used in the production of the compounds of the formulas shown above are novel. The method of producing such compounds is evident from the working examples which disclose their synthesis in detail. The following examples are illustrative and not limitative of the invention. All temperatures are expressed in degrees centigrade.

*Example 1*

A suspension of 5.6 g. (0.02 mol.) of 7-nitro-5-phenyl-3H-1,4-benzodiazepin-2(1H)-one was reduced catalytically in a shaking autoclave using Raney nickel as catalyst at 265 lbs. hydrogen pressure. The hydrogen uptake was 100% of theory at 58°. The catalyst was filtered off and the clear, almost colorless filtrate was concentrated in vacuo to dryness. The residue was crystallized from a mixture of 75 cc. of acetonitrile and 25 cc. of ethanol to obtain colorless prisms of 7-amino-5-phenyl-3H-1,4-benzodiazepin-2(1H)-one melting at 236–239°.

*Example 2*

14 g. (0.056 mol.) of 7-amino-5-phenyl-3H-1,4-benzodiazepin-2(1H)-one and 100 cc. of pyridine were stirred in a water bath at 40° for 1 hour to obtain a fine suspension. 15 cc. of acetic anhydride was added dropwise at 10 to 15° with slight cooling. A clear solution resulted which was stirred at room temperature for 3 hours. After standing overnight at room temperature, the slightly brownish reaction mixture was evaporated to dryness in vacuo on the steam bath. Several portions of ethanol were added and distilled off to remove traces of acetic anhydride. The residue was refluxed in 500 cc. of ethanol and filtered while hot. After concentrating the filtrate to 200 cc., the pure product, 7-acetamido-5-phenyl-3H-1,4-benzodiazepin-2(1H)-one, separated in white needles melting at 278–179°.

*Example 3*

To a solution of 7.26 g. (30 mmol.) of 2-amino-5-nitrobenzophenone in 350 cc. of benzene was added 2.8 cc. (60 mmol.) of bromoacetyl bromide. Dry air was blown through the solution until all the hydrogen bromide was removed. The benzene solution was washed with water until the washings were neutral, then dried over sodium sulfate and concentrated in vacuo. The residue was crystallized from a mixture of benzene and petroleum ether to give 2-bromo-acetamido-5-nitrobenzophenone in the form of colorless needles melting at 155–156°.

*Example 4*

A solution of 2 g. of 2-bromoacetamido-5-nitrobenzophenone in 30 cc. of dioxane was treated with 10 cc. of a 13% solution of ammonia in methanol. The solution was allowed to stand at room temperature for 16 hours and then concentrated in vacuo at a water bath temperature of 25°. The residue was partitioned between 50 cc. of ether and 50 cc. of 0.3 N hydrochloric acid. The ether solution was again extracted with 50 cc. of 0.3 N hydrochloric acid and the combined acid extracts were filtered and made alkaline with ammonium hydroxide. The precipitated product was filtered and dried in vacuo to give 2-aminoacetamido-5-nitrobenzophenone melting at 156–158° (dec.). Recrystallization from chloroform-ether gave light straw-colored needles melting at 166–167° (dec.).

The aqueous solution was neutralized with hydrochloric acid and deposited, on standing, fawn-colored crystals of 7-nitro-5-phenyl-3H-1,4-benzodiazepin-2(1H)-one.

2-aminoacetamido-5-nitrobenzophenone was heated for 5 minutes at 165–187°. The compound melted, frothed, and resolidified. The mass was dissolved in chloroform and decolorized with charcoal. The chloroform solution was concentrated in vacuo and treated with ether to yield crystalline 7-nitro-5-phenyl-3H-1,4-benzodiazepin-2(1H)-one.

A solution of 2.42 g. (10 mmol.) of 2-amino-5-nitrobenzophenone and 4.2 g. (30 mmol.) of glycine ethyl ester hydrochloride in 75 cc. of pyridine was refluxed for 16 hours. The pyridine was removed in vacuo and the residue was partitioned between 100 cm. of benzene and 100 cc. of water. The benzene solution was extracted with 80 cc. of 1 N sodium hydroxide and the alkaline extract was neutralized with dilute hydrochloric acid. The precipitate was filtered off, dried, then dissolved in chloroform and filtered from insoluble material. The chloroform solution was concentrated in vacuo and the residue crystallized from ether to yield crystalline 7-nitro-5-phenyl-3H-1,4-benzodiazepin-2(1H)-one.

The 2-aminoacetamido-5-nitrobenzophenone compound referred to above is not a part of this invention, but its preparation is set forth above in order that this disclosure may be complete.

*Example 5*

A solution of 2.2 g. (9.1 mmol.) of 2-amino-4-nitrobenzophenone in 150 cc. of benzene and 30 cc. of ether was treated with 0.75 cc. (9.1 mmol.) of bromoacetyl bromide. After standing for 5 minutes, the solution was washed with 150 cc. of water and the procedure was repeated with futher quantities of bromoacetyl bromide and water until the yellow color of the solution had disappeared. The organic layer was washed with water until the washings were neutral and was then dried over sodium sulfate and concentrated in vacuo. The residue was crystallized first from hexane-ether and then hexane-chloroform to give 2-bromo acetamido-4-nitrobenzophenone in the form of straw-colored plates melting at 120–121°.

*Example 6*

A solution of 2.03 g. (5.6 mmol.) of 2-bromoacetamido-4-nitrobenzophenone in a mixture of 100 cc. of ether and 50 cc. of a 10% solution of ammonia in methanol (wt./vol.) was allowed to stand at room temperature for 18 hours. The solution was then concentrated to dryness in vacuo with a wet bath temperature at 30°. The residue was partitioned between ether and water and some insoluble material was filtered off. The ether solution was dried over sodium sulfate and concentrated in vacuo. The residue was extracted with hot benzene to leave undissolved material melting at 243° (dec.). The two batches of insoluble material were combined and recrystallized from ethanol after treatment with charcoal to obtain colorless prisms of 8-nitro-5-phenyl-3H-1,4-benzodiazepin-2(1H)-one melting at 252° (dec.).

*Example 7*

A stirred solution of 75 g. of 2-amino-2'-nitrobenzophenone in 700 ml. of hot concentrated hydrochloric acid was cooled to 0° and a solution of 21.5 g. of sodium nitrite in 50 ml. of water was added in the course of 3 hours. The temperature of the suspension was kept at 2–7° during the addition. The resulting clear solution was poured into a stirred solution of 37 g. of cuprous chloride in 350 ml. of hydrochloric acid 1:1. The solid which had formed after a few minutes was filtered off, washed with water and recrystallized from ethanol. Crystals of 2-chloro-2'-nitrobenzophenone melting at 76–79° were obtained.

A solution of 20 g. of 2-chloro-2'-nitrobenzophenone in 450 ml. of ethanol was hydrogenated at normal pressure and room temperature with Raney nickel. After uptake of ca. 6 liters of hydrogen the catalyst was filtered off, and the alcohol then removed in vacuo. The residue was distilled in a bulb tube at 0.4 mm. and a bath temperature of 150–165° giving a yellow oil. The oil was dissolved in alcohol, and on addition of water, needles of 2-amino-2'-chlorobenzophenone melting at 58–60° were obtained.

To a solution of 42 g. of 2-amino-2'-chlorobenzophenone in 500 ml. of benzene, 19 ml. of bromoacetyl bromide was added dropwise. After refluxing for 2 hours, the solution was cooled, washed with 2 N sodium hydroxide and evaporated. The residue was recrystallized from methanol giving crystals of 2-bromo-2'-(2-chlorobenzoyl)acetanilide melting at 119–121°.

To a solution of 14.5 g. of 2-bromo-2'-(2-chlorobenzoyl)-acetanilide in 100 ml. of tetrahydrofuran, an excess of liquid ammonia (ca. 150 ml.) was added. The ammonia was kept refluxing with a Dry-Ice condenser for 3 hours after which time the ammonia was allowed to evaporate and the solution was poured into water. Crystals of 2-amino-2'-(2-chlorobenzoyl)acetanilide were collected, which after recrystallization from ethanol melted at 162–164°.

A solution of 3 g. of 2-amino-2'-(2-chlorobenzoyl) acetanilide in 50 ml. of pyridine was refluxed for 24 hours after which time the pyridine was removed in vacuo. The residue was recrystallized from methanol and a mixture of dichloromethane and ether giving crystals of 5-(2-chlorophenyl)-3H-1,4-benzodiazepin-2(1H)-one melting at 212–213°.

The 5-(2-chlorophenyl)-3H-1,4-benzodiazepin-2(1H)-one mentioned above is not a part of this invention but intermediates therefor and its preparation are set forth above in order that this disclosure may be complete.

To a solution of 13.5 g. of 5-(2-chlorophenyl)-3H-1,4-benzodiazepin-2(1H)-one in 60 ml. of concentrated sulfuric acid, a solution of 5.5 g. of potassium nitrate in 20 ml. concentrated sulfuric acid was added dropwise. The solution then was heated in a bath at 45–50° for 2½ hours, cooled and poured on ice. After neutralizing with ammonia, the formed precipitate was filtered off and boiled with ethanol. A small amount of white insoluble material was then filtered off. The alcoholic solution on concentration yielded crystals of 7-nitro-5-(2-chlorophenyl)-3H-1,4-benzodiazepin-2(1H)-one which, after recrystallization from dichloromethane, melted at 238–240°.

*Example 8*

7 - nitro - 5-(2-chlorophenyl)-3H-1,4-benzodiazepin-2(1H)-one (4.6 g.) was dissolved in 14.5 ml. of 1 N solution of sodium methoxide in methanol. After removing the solvent in vacuo the residue was dissolved in 50 ml. of dimethylformamide and 10 ml. of methyl iodide was added. The solution was permitted to stand for 3 hours and the solvent then distilled off in vacuo. The residue was recrystallized from a mixture of dichloromethane and ether yielding crystals of 1-methyl-5-(2-chlorophenyl) - 7-nitro-3H-1,4-benzodiazepin-2(1H)-one melting at 194–195°.

*Example 9*

A solution of 2.25 g. (9.3 mmol.) of 2-amino-5-nitrobenzophenone in 150 cc. of benzene was treated with 2 cc. (18.6 mmol.) of α-bromopropionyl bromide. Dry air was blown through the solution for one hour until the hydrogen bromide had been removed. The solution was then concentrated in vacuo and the residue was crystallized from ether. The 2-(α-bromopropionamido)-5-nitrobenzophenone was recrystallized from a mixture of chloroform and hexane to obtain light straw-colored needles melting at 116–117°.

*Example 10*

A solution of 2.37 g. (6.3 mmol.) of 2-(2'-bromopropionamido)-5-nitrobenzophenone in 40 cc. of dioxane and 10 cc. of a 13% solution of ammonia in methanol (wt./vol.) was allowed to stand for 24 hours at room temperature. The solution was concentrated to dryness in vacuo and the residue was partitioned between water and an ether-methylene chloride mixture. The organic layer was dried over sodium sulfate, treated with charcoal and then concentrated in vacuo. The residue was chromatographed on a 10 g. alumina column using first a benzene-hexane eluant which removed the starting material and 2-amino-5-nitrobenzophenone. The column was then eluted with ether to obtain 7-nitro-5-phenyl-3-methyl-1,4-benzodiazepin-2(1H)-one which was isolated and melted at 219–221°.

*Example 11*

5.6 g. (0.02 mol.) of 7-nitro-5-phenyl-3H-1,4-benzodiazepin-2(1H)-one was suspended in 75 cc. of methanol. 1.1 g. (0.022 mol.) of sodium methylate was added with stirring. The clear yellow-brown solution was concentrated to dryness in vacuo giving the yellow sodio derivative. This sodio derivative was dissolved in 70 cc. of dimethylformamide. 3.8 cc. (8.52 g.=0.06 mol.) of methyl iodide was added dropwise, the temperature rising to 30°. The reaction mixture was cooled and stirred for 1½ hours. The clear brown solution was added to about 500 cc. of ice and water with stirring. The fine yellow precipitate was filtered off, washed with ice water, sucked dry and dried in vacuo at 50° over sodium hydroxide. The pure 1-methyl-7-nitro-5-phenyl-3H-1,4-benzodiazepin-2(1H)-one crystallized in needles from dilute ethanol and melted at 156–157°.

Hydrolysis of the compound obtained above in dilute hydrochloric acid gave 2-methylamino-5-nitrobenzophenone which crystallized in yellow needles from acetonitrile and melted at 159–161°.

*Example 12*

A solution of 1.95 g. (7.75 mmol.) of 2-amino-3-nitrobenzophenone in 60 ml. of nitromethane was treated with 2.15 ml. (23.25 mmol.) of bromoacetyl bromide. After standing for 15 minutes the color lightened noticeably. Dry air was then blown through the solution for 1½ hours to remove hydrogen bromide. The solution was partly concentrated, diluted with ether and washed with water until the washings were neutral. The organic layer was dried over sodium sulfate and concentrated in vacuo. The residue was crystallized from ether to give light-straw prisms of 2-bromoacetamido-3-nitrobenzophenone, melting at 120.5–121.5°.

*Example 13*

A solution of 1 g. (2.75 mmol.) of 2-bromoacetamido-3-nitrobenzophenone in 40 cc. of nitromethane was cooled in an ice bath and for 20 minutes saturated with ammonia. After standing 3 hours the solution was concentrated in vacuo. The residue was extracted from the inorganic salts with a mixture of ether and methylene chloride. The solution was treated with charcoal, filtered and concentrated in vacuo. The residue was crystallized from a mixture of benzene-hexane to give 9-nitro - 5-phenyl-3H-1,4-benzodiazepin-2(1H)-one which, after recrystallization from ethanol, formed pale yellow needles melting at 144–145°.

*Example 14*

A solution of 4.5 g. (10.9 mmol.) of 2-(2'-bromopropionamido)-5-nitrobenzophenone in 100 cc. of nitromethane was saturated with ammonia and allowed to stand at room temperature for 70 hours. The solution was concentrated in vacuo at a water bath temperature of approximately 20°. The residue was dissolved in a methylene chloride-ether mixture and the inorganic salts were filtered off. The filtrate was concentrated in vacuo and the residue was crystallized from a mixture of benzene and hexane.

The benzene-hexane mother liquor was chromatographed on a column prepared with 130 g. of activated alumina. A mixture of benzene and hexane (5:2) was used as an eluant for the initial elution. On further elution with ether, 7-nitro-5-phenyl - 3 - methyl-3H-1,4-benzodiazepin-2(1H)-one was obtained. This was washed with ether and crystallized from a benbene-hexane mixture to give colorless needles melting at 219–221°.

*Example 15*

To a solution of 21 g. of 2-amino-2'-nitrobenzophenone in 250 ml. of acetic acid a solution of 35 g. of bromine in 25 ml. of acetic acid was added dropwise in the course of 1½ hours. The temperature was kept at 20°. The solution was stirred for 22 hours, after which period the excess of bromine was removed in vacuo. The solution was then poured into water, the resulting precipitate filtered and crystallized from alcohol giving crystals of 2-amino-3,5-dibromo - 2' - nitrobenzophenone melting at 167–169°.

Example 16

To a solution of 62 g. of 2-amino-2'-nitrobenzophenone in 250 ml. of dichloromethane, 27 ml. of bromoacetyl bromide was added dropwise. The solution was refluxed for 2 hours, cooled, washed with sodium bicarbonate solution, and evaporated to dryness. The residue was crystallized from benzene giving crystals of 2-(2-bromoacetamido)-2'-nitrobenzophenone melting at 157–159°.

To a solution of 20 g. of 2-(2-bromoacetamido)-2'-nitrobenzophenone in 200 ml. of tetrahydrofuran, an excess of liquid ammonia (ca. 200 ml.) was added. The ammonia was kept refluxing for 4 hours using a Dry-Ice condenser. Then the ammonia was allowed to evaporate slowly. After an over-all reaction time of 17 hours, the solution was concentrated in vacuo and poured into a sodium bicarbonate solution. The solid material was filtered off and crystallized from alcohol yielding crystals of 2-amino-2'-(2-nitrobenzoyl)acetanilide melting at 157–159°.

The above-mentioned 2-amino - 2' - (2-nitrobenzoyl)-acetanilide is not a part of this invention but its preparation is set forth above in order that this disclosure may be complete.

A solution of 5 g. of 2-amino - 2' - (2-nitrobenzoyl)-acetanilide in 50 ml. of pyridine was refluxed for 26 hours. After this time the pyridine was removed in vacuo and the residue dissolved in a boiling mixture of 9 ml. of alcohol, 45 ml. of concentrated hydrochloric acid and 45 ml. of water. Decolorizing carbon was added and after keeping the mixture on the steam bath for about 5–10 minutes all insoluble material was filtered off. The clear solution was cooled, neutralized with ammonia and extracted with a mixture of dichloromethane and ether. The organic phase was concentrated by evaporation and the residue recrystallized from benzene. Crystals of 5-(2-nitrophenyl) - 3H - 1,4 - benzodiazepin-2(1H)-one melting at 206–208° were obtained.

Example 17

To a solution of 3.3 g. of 5-(2-nitrophenyl)-3H-1,4-benzodiazepin-2(1H)-one in 15 ml. of concentrated sulfuric acid, 1.3 g. of potassium nitrate dissolved in 10 ml. of concentrated sulfuric acid was added dropwise. The temperature was kept at 25° for one hour after which the solution was heated for 3 hours in a bath of 50°.

After cooling, the solution was poured on ice and neutralized with ammonia. The solid material which had formed was filtered and crystallized from tetrahydrofuran yielding crystals of 7-nitro - 5 - (2-nitrophenyl)-3H-1,4-benzodiazepin - 2(1H) - one which, after drying at 70° in vacuo, melted at 226–228°.

Example 18

To a solution of 2.8 g. of 7-nitro-5-(2-nitrophenyl)-3H-1,4-benzodiazepin - 2(1H) - one in 20 ml. of methanol 8.5 ml. of a 1 N solution of sodium methoxide in methanol was added. After removal of the methanol in vacuo the residue was dissolved in 40 ml. of dimethylformamide and 8 ml. of methyl iodide was added. After standing for 3 hours at room temperature the solvent was evaporated in vacuo, the residue treated with ice water, and filtered. Crystallization from a mixture of dichloromethane and methanol gave crystals of 1-methyl-7-nitro-5-(2-nitrophenyl) - 3H - 1,4 - benzodiazepin-2(1H)-one melting at 209–212°.

Example 19

A solution of 29.5 of 1-methyl-7-nitro-5-phenyl-3H-1,4-benzodiazepin-2(1H)-one in 500 ml. of ethanol was hydrogenated at room temperature and atmospheric pressure for four hours in the presence of 0.7 g. of wet Raney nickel. Filtration, followed by concentration of the filtrate, yielded crude product which up recrystallization from ethanol gave 7-amino-1-methyl - 5 - phenyl-3H-1,4-benzodiazepin-2(1H)-one as yellow prisms melting at 238–240°.

Example 20

A solution of 10 g. of 7-nitro-5-(2-chlorophenyl)-3H-1,4-benzodiazepin-2(1H)-one in 1 l. of ethanol was hydrogenated overnight at room temperature and atmospheric pressure in the presence of 0.6 g. of wet Raney nickel. Filtration and concentration of the filtrate yielded 7-amino - 5 - (2-chlorophenyl) - 3H - 1,4 - benzodiazepin-2(1H)-one as yellow needles which, upon recrystallization from ethanol, melted at 230–232°.

This application is a continuation-in-part of copending application Serial No. 104,227, filed April 20, 1961, which in turn is a continuation-in-part of application Serial No. 38,732, filed June 27, 1960 and now abandoned.

We claim:
1. A compound of the formula

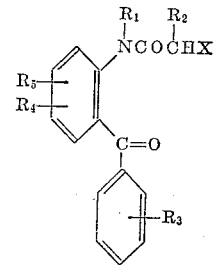

wherein X is halogen; $R_1$ and $R_2$ are each selected from the group consisting of hydrogen and lower alkyl; $R_3$, $R_4$ and $R_5$ are each selected from the group consisting of hydrogen, halogen, lower alkyl, nitro, amino and lower alkonoylamino; at least one of $R_3$, $R_4$ and $R_5$ being a nitrogen containing group.

2. 2-haloacetamido-5-nitrobenzophenone.
3. 2-(N-methyl—haloacetamido) - 2' - nitrobenzophenone.
4. 2-haloacetamido-2'-nitrobenzophenone.
5. 2-(N - methyl—haloacetamido) - 5 - nitrobenzophenone.
6. 2-halopropionamido-5-nitrobenzophenone.
7. 2-bromoacetamido-5-nitrobenzophenone.

No references cited.

UNITED STATES PATENT OFFICE
CERTIFICATE OF CORRECTION

Patent No. 3,121,114                          February 11, 1964

Oscar Keller et al.

It is hereby certified that error appears in the above numbered patent requiring correction and that the said Letters Patent should read as corrected below.

Column 3, line 25, for "179°" read -- 279° --; same column 3, line 70, for "100 cm." read -- 100 cc. --.

Signed and sealed this 18th day of August 1964.

(SEAL)
Attest:

ERNEST W. SWIDER                              EDWARD J. BRENNER
Attesting Officer                                   Commissioner of Patents